United States Patent [19]

Donner

[11] 4,091,839
[45] May 30, 1978

[54] BALL CHECK VALVE
[75] Inventor: Verne P. Donner, Palatine, Ill.
[73] Assignee: Deltrol Corp., Bellwood, Ill.
[21] Appl. No.: 494,749
[22] Filed: Aug. 5, 1974
[51] Int. Cl.² .............................................. F16K 15/04
[52] U.S. Cl. ................................. 137/533.13; 137/539
[58] Field of Search ............... 137/539, 539.5, 533.11, 137/533.13

[56] References Cited
U.S. PATENT DOCUMENTS

| 1,989,199 | 1/1935 | Hummert | 137/533.13 |
| 3,002,528 | 10/1961 | Leissner | 137/539 |
| 3,219,057 | 11/1965 | Knowles | 137/539 |
| 3,421,547 | 1/1969 | Aslan | 137/539 |

Primary Examiner—William R. Cline
Attorney, Agent, or Firm—John L. Harris

[57] ABSTRACT

The ball in a ball type check valve is guided by a wire form ball cage. The cage is formed of two spring wire pieces each having two ball guiding legs, attached by cross members formed with interfitting loops which hold the pieces together by spring tension. Each guiding leg is formed with a reverse bend extending outwardly and then rearwardly along the valve body walls, this positioning the guide in the valve body. The cage is formed larger than the inside of the valve body in which it fits and also serves as a retainer for the ball valve spring. The assembly of the cage, spring and ball valve is inserted through the outlet port and the cage expands behind a shoulder in the body, locking it in place by spring tension.

4 Claims, 11 Drawing Figures

BALL CHECK VALVE

BACKGROUND OF INVENTION

This invention relates in general to valves having ball members and more particularly to ball check valves.

Use of a ball as the valve member in a check valve provides a precision and long lasting part at low cost. However the ball must be guided and the provision of a suitable guide offsets part of the cost savings realized by using a ball.

My U.S. Pat. No. 3,559,678 shows a ball guide of moulded plastic This guide supports the ball and is slidable in the valve body, being biased by a spring held in place by an internal retainer ring. This has served well except when subjected to higher temperatures and simultaneous shock loads.

BRIEF SUMMARY OF THE INVENTION

The primary object of the invention is to provide a guide for ball valves which is not subject to heat weakening, which is undamaged by shock loads; which is low in cost to manufacture and which is low in cost to install.

These results are achieved by the invention of a wire form ball cage. Spring wire is used, and spring tension of the wire holds the parts of the ball cage together and also holds the ball cage in place inside the valve body. Assembly is made by first pushing two wire form pieces together to form the ball cage and then pushing the assembly into the valve body.

Another object of the invention is the provision of a wire form ball cage having arms supporting and guiding the ball at four points. This is achieved by the provision of two separate flat generally U shaped guides having interfitting loops in their crossmembers. These loops hold the two guides 90° apart with spring tension.

A further object of the invention is the provision of a ball cage that holds the ball in spaced relationship with the side walls of the valve body for allowing free fluid flow around the ball. This is achieved by forming the free ends of the guide members with reverse bends extending outwardly from the ball and then back along the sidewalls of the valve body a sufficient distance to give good support and location to the cage.

Another object of the invention is the provision of a ball cage valve in which no additional parts are required for holding the ball cage in the valve body. This is achieved by forming the valve body with an internal valve chamber larger than its outlet passage, and utilizing the spring effect of the wire form to expand into the chamber when the wire form is pushed into place through the outlet passage.

A further object is the provision of a ball cage which also serves to support a compression spring for the ball.

Other objects of the invention will appear from the following detailed description and appended claims.

DETAILED DESCRIPTION OF INVENTION

Figure 1:
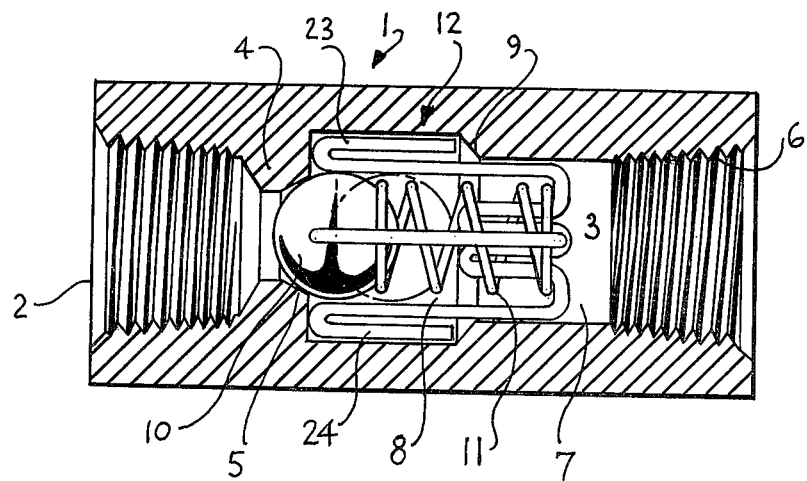
FIG. 1 is a crossection of a ball check valve having a wire form ball cage embodying the invention.

Referring to FIG. 1, reference character 1 indicates generally a valve body having a threaded inlet passage 2 and an outlet passage 3 separated by a partition 4 formed with a ball valve seat 5 facing the outlet passage. The outlet passage 3 is formed with a threaded section 6 joining a section of relatively small diameter or dimension 7 which in turn joins a section of relatively large diameter or dimension 8 adjacent the valve seat 5. The junction of sections 7 and 8 is preferably abrupt, forming a shoulder 9. A ball valve member 10 is located in the large passageway section 8 and is pressed against valve seat 5 by a compression spring 11. The large section 8 of the outlet passageway is substantially larger than ball valve member 10 to allow free fluid passage around the valve member. The valve member is guided in passageway 8 and the compression spring 11 is retained in place by a wire form guide generally indicated as 12.

Figure 2:
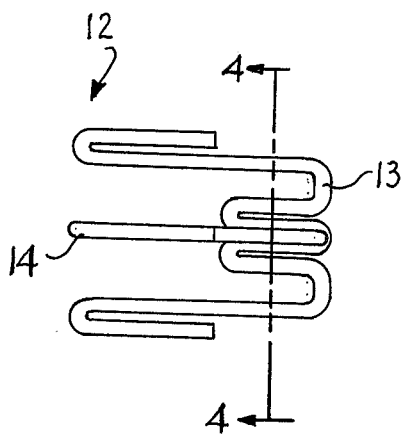
FIG. 2 is a side view of the ball cage assembly.
Figure 3:
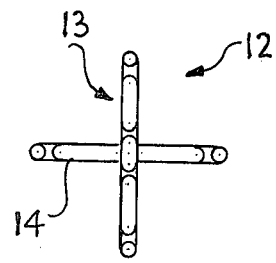
FIG. 3 is an end view of FIG. 2.
Figure 4:
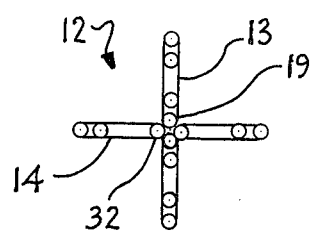
FIG. 4 is a sectional view taken on line 4—4 of FIG. 2.

The assembly of this guide is more clearly shown in FIGS. 2, 3 and 4. It consists of two parts 13 and 14 which are perpendicular to each other and which are held together by spring tension.

Figure 5:
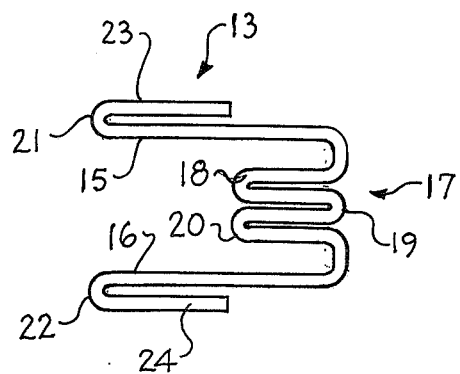
FIG. 5 is a side view of one part of the ball guide.
Figure 6:
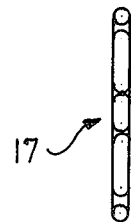
FIG. 6 is an end view of FIG. 5.

Part 13 is shown in detail in FIGS. 5 and 6. This is a single piece of spring wire formed with two spaced and generally parallel ball guide portions 15 and 16 connected by a transverse portion 17. This transverse portion or crossmember is formed with three loops 18, 19, and 20. Loops 18 and 20 are outside loops extending toward the valve seat and loop 19 is a center loop extending in the reverse direction and joining the outside loops. Guide portions 15 and 16 at their left hand ends are formed with reverse bends 21 and 22 and rearwardly extending leg portions 23 and 24 which serve as mounting portions in the outlet passage. Leg portions 23 and 24 terminate in cut-offs as shown.

Figure 7:
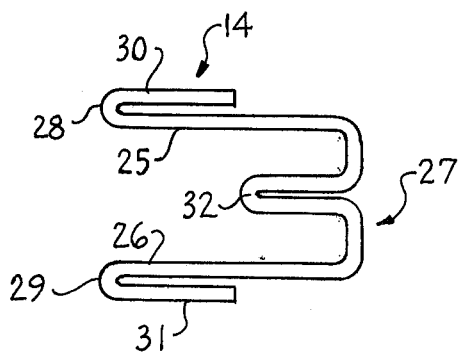
FIG. 7 is a side view of the other part of the ball guide.
Figure 8:
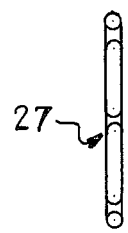
FIG. 8 is an end view of FIG. 7.

Part 14 of the ball guide assembly is formed as shown in FIGS. 7 and 8. This is a flat single piece having guide portions 25 and 26 joined by a transverse portion or crossmember 27 and having reverse bends 28 and 29 with rearwardly extending legs 30 and 31 which serve as mounting portions. The transverse portion 27 differs from the corresponding portion 17 of part 13 in that it includes only a single loop 32 which extends toward the valve seat.

In making the assembly of FIGS. 2 and 3, part 14 is inserted into part 13 from the left hand end of part 13 as shown in FIG. 2. The legs of the single loop 32 in part 14 slide between the legs of center loop 19 in part 13. The space between the legs of each loop is originally formed with less distance than require to receive the legs of the other loop. Thus during assembly the legs must spring apart to receive the other loop. As a result the assembly holds itself together with spring tension. The pressure of the legs of each loop on the legs of the other loop holds the parts firmly together at right angles as shown in FIG. 4.

The assembly of FIG. 1 is completed by first inserting the spring 11 and ball 10 into the guide assembly 12. The left hand ends of the guides are then compressed and pushed into threaded portion 6 of the outlet passage 3. As the ball and guide assembly are pushed into place, the spring keeps the ball ahead of the guide so the legs of the guide are free to compress inwardly and pass through the small diameter section 7. When the assembly reaches its final position, the ends of the reverse bends expand behind shoulder 9 and the assembly is now locked in place. The forward ends of the reverse bends locate the arms of the guide to align the ball valve with its seat. The rear ends of the reverse bends engaging the shoulder 9 keep the assembly from backing out. In addition, the back end of the assembly fitting into the reduced diameter portion 7 of the outlet passage also helps align the assembly in the valve body.

Preferably the outside dimensions of the ball cage when free are slightly larger than the diameter of section 8 of the passageway. As an example, if the passageway diameter is 0.687 inch, the outside dimensions would be made approximately 0.695 assuming use of 0.045 stainless steel spring wire. This arrangement causes the ball cage to be held in place by spring tension and avoids rattling of the cage in the valve body.

It should be noted that the loops 18, 19, 20 and 32 in addition to holding the parts together also act as a stopping means to limit the opening travel of ball valve member 10. As shown in FIG. 1, the right hand end of the ball case assembly extends into the small diameter passageway section 7 and the loops extend to the left to approximately the junction between sections 7 and 8. Also, the reverse bends 23-24 of the ball cage have sufficient length to extend back along the sidewall of section 8 to the shoulder 9. This effectively positions the cage in the valve body and establishes the location of the ball valve stopping means formed by the loop. This insures that the ball valve member cannot travel too far in opening direction regardless of impact or shock loads.

Figure 9:
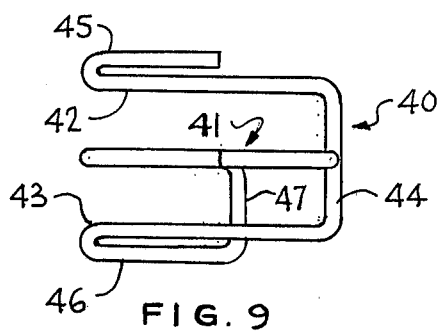
FIG. 9 is a top view of a modified single piece ball guide.
Figure 10:
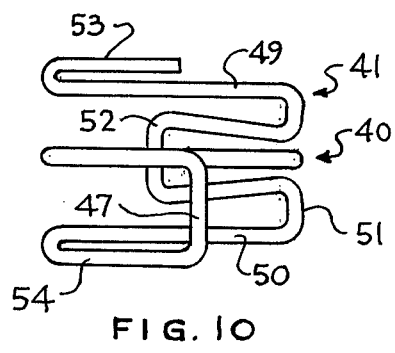
FIG. 10 is a side view of FIG. 9.
Figure 11:
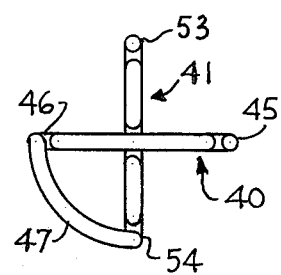
FIG. 11 is an end view of FIG. 10.

FIGS. 8, 9 and 10 show an alternative construction in which the cage is made in one piece. This eliminates snapping two pieces together as done in the preferred embodiment. It has the disadvantage of requiring much more elaborate form tooling.

This part includes two sections 40 and 41 at right angles to each other. Section 40 includes two spaced parallel guide portions 42 and 43 connected by a crossmember 44 and having reverse bends 45 and 46. Reverse bend 46 at its end is formed with a crossover section 47 leading to section 41. As shown in FIG. 10, section 41 is formed with spaced parallel guide portions 49 and 50 connected by a transverse section 51 formed with a single ball stopping loop 52. Guide portion 49 is formed with a reverse bend 53 and guide portion 50 is formed with a reverse bend 54 which joins the crossover section 47.

From the foregoing it will be apparent that the invention provides a simple cage for guiding a ball valve member, for retaining the spring, and for limiting movement of the valve member. It will further be apparent that the cage is not subject to deterioration, and retains itself in place in the valve body. It will also be apparent that the device is inexpensive to manufacture and is quickly assembled.

I claim:

1. In a ball type check valve, the combination of, a valve body formed with inlet and outlet passages having sidewalls and separated by a ball valve seat facing the outlet passage, a ball valve member located in the outlet passage and adapted to engage and block the ball valve seat, said outlet passage adjacent the ball valve member being substantially larger than the ball valve member providing passage for fluid flow through the outlet passage around the ball valve member, guide means in the outlet passage arranged to guide the ball valve member in the outlet passage and align it with the valve seat, said guide means including a pair of spaced parallel guiding arms joined by a transverse portion in the outlet passage downstream of the valve seat, said guiding arms extending toward the valve seat and constituting a guiding portion for the ball valve member, said guiding arms also having reverse bends near the valve seat and extending outwardly and rearwardly in contact with the sidewalls of the outlet passage, said reverse bends constituting mounting portions of the guide means, a second guide means formed similarly to the first guide means and spaced angularly from the first guide means to provide four point support for the ball valve member, said first and second guide means being separate spring wire forms joined at their transverse portions, the transverse portions of each wire form part including a central loop portion extending parallel with the spaced parallel arms, said loop portions interfitting and securing the two parts together by spring tension.

2. The combination recited in claim 1 in which the loop portion on one part is a single loop and the loop portion on the other part is a triple loop including a center loop and two outside loops, the single loop on the one part fitting with the center loop of the other part.

3. The combination recited in claim 1 in which the mounting portions of the spring wire form parts are spaced a distance larger than the space between the outlet passage sidewalls engaged by the mounting portions, whereby the guide means is held in place by spring tension.

4. In a ball type check valve, the combination of, a valve body formed with inlet and outlet passages having sidewalls and separated by a ball valve seat facing the outlet passage, a ball valve member located in the outlet passage adapted to engage and block the ball valve seat, said outlet passage adjacent the ball valve member being substantially larger than the ball valve member providing passage for fluid flow through the outlet passage around said ball valve member, a spring wire form guide means in the outlet passage having a guiding portion arranged to guide the ball valve member in the outlet passage and align it with the valve seat, said wire form guide means being formed with a mounting portion having normal outside dimensions larger than the outlet passage and yielding to a reduced dimension when inserted in the valve body through the outlet passage, said wire form guide means including a pair of spaced parallel ball guiding arms of spring wire joined by a transverse portion in the outlet passage downstream of the valve seat, said arms extending from the transverse portion toward the valve seat and terminating in cut-offs spaced from the transverse portion, a second guide means formed similarly to the first guide means and spaced angularly from the first guide means to provide four point support for the ball valve member, the first and second guide means being joined at their transverse portions, the transverse portion of each guide means including a central loop portion extending parallel with the spaced parallel arms, said loop portions interfitting and securing the two guide means together by spring tension.

* * * * *